(No Model.)
G. W. HARRINGTON.
PIPE COUPLING OR FITTING.
No. 492,159. Patented Feb. 21, 1893.
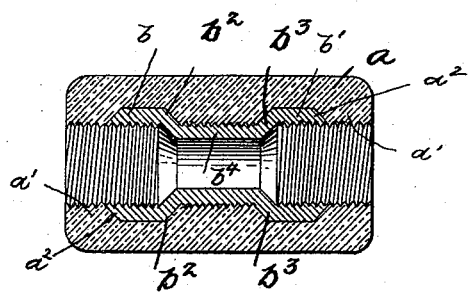
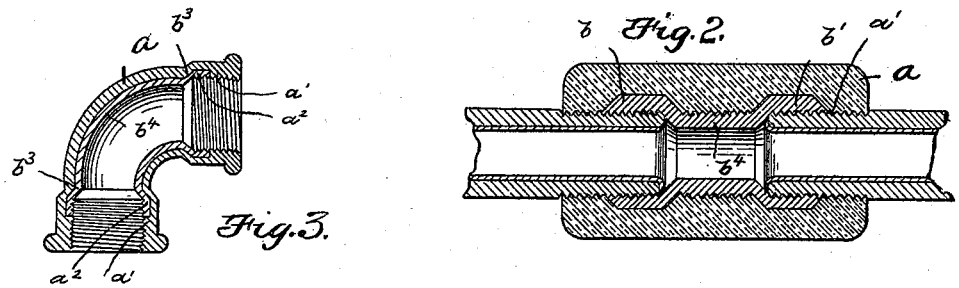
Witnesses:
Inventor,
G. W. Harrington
By Knight Bros & Crossby
his Attorneys.

UNITED STATES PATENT OFFICE.

GEORGE W. HARRINGTON, OF WAKEFIELD, MASSACHUSETTS.

PIPE COUPLING OR FITTING.

SPECIFICATION forming part of Letters Patent No. 492,159, dated February 21, 1893.

Application filed April 8, 1892. Serial No. 423,309. (No model.)

*To all whom it may concern:*

Be it known that I, GEORGE W. HARRINGTON, of Wakefield, in the county of Middlesex and State of Massachusetts, have invented certain new and useful Improvements in Pipe Couplings or Fittings, of which the following is a specification.

My invention has reference to couplings or other fittings whereby sections of pipe or tubing are connected, and is designed for use more especially with pipes having an interior lining of lead, as described in my application for United States Letters Patent dated November 20, 1891, Serial No. 412,492.

The object of my invention is to provide, in pipes generally, a means of making a close and serviceable joint and, in lead-lined pipes, a connection which will afford a continuous lining of lead through the connection.

My invention consists generally in a section of pipe composing the coupling, which is internally screw-threaded, as usual in pipe couplings. Within each end of the coupling is an enlarged portion, tapered or beveled toward the exterior of the coupling. These enlarged portions are provided with a lead filling which covers the internal surface of the shell, excepting at the ends thereof. The lead filling in the enlargements is screw-threaded to form a continuation of the thread in the coupling. The filling between these enlargements forms shoulders adjacent to the screw-threads against which the inserted sections of pipe are adapted to rest.

In the accompanying drawings I have shown an embodiment of my invention, although it is obvious that I am not confined to the precise construction shown and described.

Figure 1 is a sectional view, showing the lead bushing formed in place. Fig. 2 is a section, showing two sections of lead-lined pipe inserted in the coupling; and Fig. 3 is an elbow joint supplied with my improved bushing.

The coupling $a$, having screw-threads $a'$, is enlarged near the ends, as at $b\ b'$. These enlargements preferably taper toward the exterior of the coupling, as shown. Within the coupling is formed in any suitable way, a lead lining or bushing $b^4$ which fills the enlargements $b\ b'$ and covers all portions of the interior of the coupling, excepting the screw-threaded portions between said enlargements and the ends of the coupling. In the end portions of the lining, or those portions filling the enlargements $b\ b'$ are formed screw threads $a^2$ which are continuations of the threads $a'$ on the coupling. The intermediate portion of the lining projects inwardly, its ends forming shoulders $b^2\ b^3$ against which the beaded or turned-up ends of the lead linings of the lengths of pipe screwed into the coupling may abut. I have described in my before-mentioned application the process of beading or turning up the lead lining of severed sections of pipe, by removing a portion of the external iron piping and turning back or beading the extended lining upon the pipe by means of a swage or plug.

It will be seen from the foregoing that I have devised a coupling which will afford a perfect joint for pipes of any character, and will be especially advantageous in connection with lead-lined pipe; it being unnecessary to dwell upon the advantage of protecting the iron shell from the corrosive influence of water and other fluids.

The general features above described are shown in the elbow coupling illustrated in Fig. 3, the chief difference being the form of the coupling between its pipe receiving ends.

I claim—

An improved coupling or fitting for lined pipe, comprising a hard metal shell internally screw-threaded and having two internal enlargements, a lead lining or bushing formed within said shell and screw-threaded at its ends to form lead continuations of the screw threads at the ends of the coupling, the intermediate portion of said shell and lining projecting inwardly and forming shoulders against which the ends of the pipe sections abut, substantially as set forth.

In testimony whereof I have signed my name to this specification, in the presence of two subscribing witnesses, this 6th day of April, A. D. 1892.

G. W. HARRINGTON.

Witnesses:
 C. F. BROWN,
 A. D. HARRISON.